United States Patent Office 3,663,684
Patented May 16, 1972

3,663,684
CARCINOEMBRYONIC ANTIGEN AND DIAGNOSTIC METHOD USING RADIOACTIVE IODINE
Samuel Orkin Freedman, Westmount, Phil Gold, Cote St. Luc, and John Henry Krupey, Montreal, Quebec, Canada, assignors to Hoffmann-La Roche Inc., Nutley, N.J.
No Drawing. Filed June 1, 1970, Ser. No. 38,069
Int. Cl. A61k 27/04; G01n 31/08
U.S. Cl. 424—1
22 Claims

ABSTRACT OF THE DISCLOSURE

Methods for ioslating, identifying and detecting carcinoembryonic antigen which originates in the digestive system epithelium derived from embryonic entodermal tissue are disclosed.

BACKGROUND OF THE INVENTION

The neoplastic process in human beings has been and still is the subject of intensive study. In order to obtain a better understanding of the disease, human cancer tissue has been studied in an effort to discover the cause, treatment, prevention and/or diagnosis of cancer. Early diagnosis of cancer is very important since it increases the chances of effecting a complete remission of the disease.

In an effort to utilize known diagnostic tools to detect the presence of cancer tumors, attempts have been made to demonstrate tumor specific antigens to human carcinoma. These attempts have previously been unsuccessful since it has not been possible to segregate normal tissue antigens from abnormal cancer antigens and demonstrate that the cancer antigens are specific.

In the attempts to isolate abnormal cancer antigens and demonstrate their specificity, attempts have been made to cause the formation of tumor-specific antibodies and demonstrate their presence in sera obtained from animals immunized with preparations of human cancer. If consistently reproducible, the demonstration of the presence of tumor-specific antibodies in animal antisera would lead to the use of a valuable diagnostic tool.

In order to fully utilize the existence of tumor-specific antibodies in animal antisera as a diagnostic tool, a test must be developed which will demonstrate the presence of the tumor-antigen in the blood of the patient. Previously devised procedures have not proven efficient or effective in the detection of digestive system cancer.

Among the human carcinoma most extensively studied by investigators is adenocarcinoma of the colon and digestive tract, since this is one of the most wide-spread cancers and usually requires a surgical procedure for definitive diagnosis, after some gross symptomatology has developed.

Previous effects to extract an antigen associated with colonic cancer have been unsuccessful since it has not been possible to completely segregate it from normal tissue antigens. Indeed, it had not been demonstrated that such an antigen did in fact exist.

We have, however, demonstrated the presence of antigens which are specific to adenocarcinomata of the colon and digestive system by means of immunological tolerance and absorption techniques, Gold et al., J. Exptl. Med. 121 439–462 (1965). However, the practical isolation of the antigen itself had until the present invention not been achieved.

These tumor specific antigens have been found by us to be present only in patients who have adenocarcinoma which originate in digestive system epithelium derived from embryonic entodermal tissue, i.e., esophagus, stomach, duodenom, pancrease and rectum.

We have also previously demonstrated that the tumor specific antigen is also present in the digestive organs of fetuses between two and six months of gestation, Gold et al., J. Exptl. Med. 122 467–487 (1965). Thus, for convenience, we have designated the antigen as carcinoembryonic antigen (CEA) of the human digestive system.

Not only has it been heretofore not possible to isolate and characterize the CEA but it has not been possible to demonstrate its presence in the blood of persons having adenocarcinoma of the colon. This is true because the antibodies formed in response to the CEA combine with the CEA into a complex, thus removing the antigen from the blood. Methods, therefore, had to be devised to destroy the antibody-antigen complex without altering the antigen determinant sites. Further, once this had been accomplished, it became necessary to find a means of tagging CEA so it can be detected.

DETAILED DESCRIPTION OF THE INVENTION

According to this invention, we have discovered (a) CEA and methods that enable its isolation, purification and confirmation of its identity and specificity;
(b) methods of producing specific antibodies for CEA;
(c) methods for tagging CEA and the novel tagged CEA;
(d) methods for utilizing the tagged CEA to detect the presence of adenocarcinoma originating in digestive system epithelium derived from embryonic entodermal tissue; and
(e) methods for treating serum to dissociate CEA-anti-CEA complexes.

The carcinoembryonic antigen is isolated and purified by homogenizing adenocarcinoma tissue from primary or metastatic tumors originating within the digestive system.

In order to isolate the antigen associated with the homogenized tumor tissue, it is necessary to separate all other material from the homogenate. This is accomplished by chemical and physical extraction and purification procedures.

Once the extraction and purification procedures are completed, the identity of the isolated fraction as CEA must be confirmed. This is accomplished by various techniques known in the art, e.g., double diffusion in agar gel, immunoelectrophoresis, hemagglutination, passive cutaneous anaphylaxis and the like.

In order to utilize these techniques, the antibodies used must be confirmed to be specific for the CEA. Antibodies which meet this criteria can be produced by immunological tolerance or absorption techniques.

In the absorption technique, antitumor antiserum is absorbed with normal tissue in order to remove anti-normal components of the antiserum. Any residual antibody activity in the absorbed antiserum which is directed against tumor material is then considered to be tumor specific. This method is not without its faults since there is the possibility that tumor specific antibodies may have been removed or inactivated by normal tissue components similar to, but not identical with, the tumor antigens which initially stimulated the antibody production.

In the immunological tolerance technique, animals are rendered immunologically tolerant to normal tissues during neonatal life. The tolerant animals are then immunized with tumor preparations of the same donor species. Where adequate suppression of the immune response to normal tissue components has been achieved, the development of antibodies apparently specific for the tumor has been achieved. In studies of human cancer, this technique is open to possible misinterpretation since the source of the normal and tumor material are different donors. However, if extracts of the tissues are used, this problem is not significant since the extracts are all substantially similar.

We have found that colon adenocarcinoma tumor tissue and normal colon tissue from the same individual can be utilized because carcinoma of the colon almost never extends submucosally more than 6 to 7 cm. on either side of a tumor visible in the gross.

The colon adenocarcinoma tumor tissue and normal colon tissue from the same individual are treated separately but in parallel fashion. The tissue is ground up, suspended in a buffer, then homogenized. The homogenate is then treated to remove solid particles. Centrifugation or filtering through successively smaller filter openings are preferred. The purpose is to remove all particles about $0.22\mu$ or larger, thus removing all the bacteria present. The supernatant or filtrate is thereby sterilized to insure against bacterial contamination.

Test animals divided into appropriate groups are then immunized with the extracts and after a suitable time interval serum is obtained from the animals. The presence of antibodies in the test sera is demonstrated by either the Ouchterlony technique of double diffusion in agar gel, immunoelectrophoresis, hemagglutination reactions or passive cutaneous anaphylaxis. The preferred practical method, because of its simplicity and reproducible results is the Ouchterlony technique.

Once the antibodies are demonstrated to be present, it is possible to determine if a particular extraction technique does, in fact, isolate a fraction which contains carcinoembryonic antigen.

We have discovered an extraction and purification technique which results in a fraction which invariably produces one precipitant line in the Ouchterlony technique when tested against the antibody which is specific for CEA or when tested against non-absorbed antisera.

As stated previously, the CEA is isolated and purified, according to this invention, from primary or metastatic adenocarcinoma tissue which originates in the digestive system epithelium that is derived from embryonic entodermal cells. Also, the CEA can be isolated and purified according to this invention from embryonic digestive organs of fetuses in the second to seventh month of gestation. The following description will be directed to extraction from cancer tissue, however, the process may apply also to embryonic tissue.

Tissue containing CEA, either embryonic digestive organ tissue from the first and second trimesters or adenocarcinoma tissue of tumors which originated within the digestive system epithelium as described above are extracted with a glycoprotein solvent in which CEA is soluble. This is required so that precipitable normal proteins and interfering antigenic materials can be separated from the CEA material. Glycoprotein solvents which are suitable are, e.g., perchloric acid, trichloroacetic acid, phosphotungstic acid and the like. However, perchloric acid, because of its availability and ease of use is preferred.

The tissue which is being treated is homogenized with water in order to solubilize the antigen. The amount of water used should be sufficient to solubilize all of the carcinoembryonic antigen. Generally about two liters of water per about every kilogram of tissue is sufficient. More water can be used, however, it is usually not necessary.

Any temperature below room temperature is suitable for the addition of the glycoprotein solvent to the tissue homogenate. Preferably, however, room temperature, e.g., 20° C. to 25° C. is utilized. The temperature of the glycoprotein solvent which is added to the tissue homogenate can also be variable, however, room temperature is preferred. Generally, a concentrated acid is used as the glycoprotein solvent, e.g., about 0.5 N to about 2 N, with 2 N being preferred. The solvent is added in about equal volume to the homogenate. The time in which this is accomplished is usually from about 10 to about 30 minutes. Longer times can result in loss of antigenicity.

A precipitate results. This precipitate is separated from the supernatant containing the dissolved CEA. Any convenient method of separation is suitable, e.g., filtration, centrifugation and the like.

Centrifugation is preferred because it is faster and sufficient force can be developed to remove substantially all the solid particles. Generally, about 3,000 to about 8,000 revolutions per minute are sufficient to accomplish this. This centrifugation is preferably carried out at cold temperatures, e.g., about 4° C. to about 10° C. since at these temperatures the time for sedimentation is substantially decreased.

Perchloric acid, salts such as sodium chloride and other low molecular weight materials are then removed in order to further purify the system. While it may be possible to accomplish this by precipitating the remaining proteins, it has been discovered that dialysis through a semipermeable membrane against water is most suitable. The dialysis is a critical part of the process since it eliminates all diffusible soluble materials except the higher molecular weight materials which include the CEA fraction. The dialysis can be carried out initially with tap water for about twenty-four to forty-eight hours. Then subsequent dialysis can be carried out with cold distilled water at temperatures of about 4° C. to about 10° C. However, it is possible to use only distilled water in the dialysis provided the temperature remains low and the water is changed frequently. The complete dialysis procedure takes about 48 to 96 hours.

The cloudy solution which remains after the dialysis is then dried. Spray drying can be used, however, lyophylization is the preferred method to romove water. Any conventional lyophilization process is suitable. The preferred process is wherein the material is first shell-frozen then lyophylized. It usually takes about 32 to 36 hours for the product to be lyophylized to complete dryness. However, in a preferred embodiment of the process of this invention, the lyophilization is carried out for about 24 to 30 hours so the product is not completely dry. While this step in the process is not critical to the eventual isolation of pure CEA, it is preferred since it saves time.

The partially lyophylized material can be thawed out at room temperature or at higher temperatures, e.g., about 37° C. It can also be thawed by diluting with a minimum amount of water and then the remaining particles are removed. It has been found that when the volume is kept to a minimum, the clarification can be accomplished by filtration and/or centrifugation. All particles of a size which will not pass through $0.22\mu$ filters (the size of the smallest bacteria) are removed thus clarifying and purifying the solution.

The preferred process is wherein the solution is centrifuged at high speed, i.e., from about 14,000 to 30,000 r.p.m., preferably about 14,000 r.p.m. at temperatures below about 10° C., i.e., about 4° C to about 10° C., for about 15 to 45 minutes. Higher temperatures are operable, however, they decrease the sedimentation rate and are thus not practical. After centrifugation, it is necessary to further clarify and sterilize the supernatant. This can be accomplished by filtering it sequentially through filters of diminishing pore size to remove substantially any solids and bacteria remaining. The pore sizes of the filters can vary from about $1.2\mu$ to about $0.20\mu$. Preferably, filters with $1.2\mu$, $0.45\mu$ and $0.22\mu$ are used in the order listed.

The separation of the portion of the resulting lyophylized powder containing CEA to the exclusion of other materials is accomplished according to this invention by chromatography with two different gel columns followed by electrophoresis.

We have found that the eluted fractions from the column chromatography which have a molecular weight of about 200,000 and a definite peak at the spectrophotometric absorption wave length of 280 m$\mu$ are those containing the CEA. We have further discovered that when the CEA containing fractions are subjected to electrophoresis, they have a unique migration pattern which is anodal to the application zone at the cathode at pH 8.6 with a borate buffer having an ionic strength of 0.05. The amount of migration depends upon the current and voltage used as well as the pH, buffer and ionic strength of the buffer. For example, when 400 volts and 20 ma. are used, the CEA migrates anodally about 10–14 cm. to the application zone at the same time that ferritin, a colored protein, used as a marker when applied to the cathodal extremity migrates 18 cm. anodally. Other markers can be used, however, the electrophoresis conditions will then have to be changed and the migration of the CEA and marker correlated.

The column chromatography can be accomplished by subjecting the lyophylized material, in solution, to sequential chromatography on two different gel columns in any order. Practically, however, a gel column which is used in accordance with this invention is an agarose gel. Agarose is the neutral portion of agar. The gel material which is commercially available from AB Pharmacia Uppsala, Sweden under the trade name "Sepharose." The gels are available as aqueous suspensions in 0.02% sodium azide as a preservative. The gel structure is due to hydrogn bonding. The gel is prepared in beaded form having a selected particle size and percent agarose. The concentration of the agrose in the gel determines its fractionation range.

The gels most suitable for use in this invention are those which have a particle size of from 40–190 microns and contain 4% by weight agarose. These materials named "Sepharose 4B" have a fractionation range of $3 \times 10^5$ to $3 \times 10^6$. In the process of this invention, Sepharose 4B is used since it permits the separation of the CEA containing fraction from extraneous materials of higher and lower molecular weight as well as colloidal particles.

The second column contains a gel filter material which is a hydrophilic water-insoluble cross-linked dextran polymer gel. This material and the method of its manufacture are described in British Pat. No. 854,715. The gel material, which is commercially available from AB Pharmacia, Uppsala, Sweden, under the name "Sephadex," comprises a three dimensional macroscopic network of dextran substances bonded or cross-linked together, being capable of absorbing water with swelling. The ability of the gel material to take up water is inversely proportional to the degree of cross-linkage of dextran substances in the gel material. The gel material is available in a variety of grades differing with respect to degree of porosity. The gel preferred for use in this invention has an approximate molecular weight exclusion limit of 200,000, a water regain (g. $H_2O$/g. dry gel) of $20 \pm 2.0$ a particle size of 40–120 microns and a bed volume/ml./g. dry gel of 30–40, the gel is named "Sephadex G–200."

Sephadex G–200 is employed to further purify the CEA containing fraction. Since the column has greater resolving power than the first column for the molecular weight range of 150,000 to 250,000, further separation of the CEA from higher and lower molecular weight materials is achieved. The second column, for all practical purposes, should be used only after the colloidal particles are removed by the first column since these particles will clog the column and make it ineffective. The chromatography is accomplished by dissolving the lyophylized material in an aqueous buffer at the pH wherein the carcinoembryonic antigen is electrically neutral, i.e., pH 4.5, then running the solution through the first column, collecting, dialyzing as described above and lyophylizing the active fraction to remove salts, then redissolving the collected active fraction in an aqueous buffer at the pH wherein the carcinoembryonic antigen is electrically neutral and running the solution through the second column, collecting the active fractions, dialyzing as before and lyophylizing. The reason the carcinoembryonic antigen is made electrically neutral is to minimize the interaction of the antigen with the columns and subsequent superimposition of extraneous material in the active fractions. While any convenient aqueous buffer is suitable, it is preferred to use a phosphate buffered saline (0.9%) solution. The advantage of uutilizing low temperatures, i.e., from about 4° C. to about 10° C. is that it results in increased resolution. The fractions collected from the second column are those which have a molecular weight of 200,000 and a reading with a peak at 280 m$\mu$ on an UV absorptionmeter. These fractions collected from the first column are selected based on the same criteria, however, they contain materials slightly greater and slightly less (as low as 70,000 MW) than 200,000 MW.

The active fractions from the second column are subjected to electrophoresis in order to further fractionate the CEA from impurities. This is accomplished by dissolving the active fraction, previously concentrated, in a buffer of a pH of about 8.2 to 9.2 and an ionic strength of about 0.0125 to 0.10. While any aqueous buffer with these characteristics is suitable, it is preferred to use a buffer which will increase mobility of the active fraction, i.e., a borate buffer of about pH 8.6 and ionic strength of about 0.05. It is these properties which make the migration of the CEA the same as the preferred marker used, i.e., ferritin.

The current and voltage which is used determines the extent of separation of the molecules in the fraction. It has been found that in block electrophoresis, the preferred method, about 300 to 500 volts, preferably 400 volts, is suitable with a current of about 20 ma. Other currents and voltage can be used, however, those discussed above are preferred.

Block electrophoresis is the preferred electrophoresis method because it facilitates the recovery of the desired fraction. However, other types of electrophoresis can also be used.

The material used in the block electrophoresis should support the material being tested and conduct electricity when impregnated with a buffer. Typical suitable materials are paper and gels. In the preferred electrophoresis method a cross-linked dextran gel, e.g., "Sephadex G–25" fine having an approximate molecular weight exclusion limit of 5,000, a water regain (g. $H_2O$/g. dry gel) of $2.5 \pm 0.2$, particle size of 20–80 microns and a bed volume/ml./g. dry gel of 5, is swollen in the buffer and placed on a non-conductive block, e.g., Lucite.

In the preferred method, the gel with the same buffer as the active fraction is dissolved in is placed in the block then paper contacts are placed on the gel. The block is then equilibrated in the same buffer in an electrophoresis apparatus under operating conditions. After equilibration is accomplished, a strip of the gel is removed and mixed with the buffered lyophylized CEA fraction from the second column. The resulting slurry is then poured onto the block at the same place from where the strip was removed, preferably at about the center of the block. The suitable marker, e.g., ferritin, a protein containing iron, is then spotted at the cathodal extremity of the block. After operating the electrophoresis for a predetermined length of time, in this case about 24 hours, the area containing CEA activity, i.e., 10–14 cm. anodal to the application zone, is removed. This area is removed only if the marker has moved a previously determined distance. In this case, 18 cm. anodally. The CEA activity is eluted under suction through a disposable 0.20$\mu$ cellulose acetate filter and recovered, preferably by dialysis against distilled water to remove the salt used in the elution. This results in a material that is substantially pure CEA. This is shown by either the precipitin inhibition or direct Ouchterlony testing against unabsorbed tumor antiserum. A single line precipitate indicates pure CEA activity.

In another aspect of this invention, we have discovered a method for determining the levels of carcinoembryonic antigen in body fluids of persons either with cancer or suspected cancer. More particularly, we have discovered a radioimmunoassay technique which is simple to perform and has a high degree of reproducibility and specificity.

In radioimmunoassays, it is important that the radioactive atom be sufficiently reactive with the molecule to be tagged to provide an adequate concentration of radioactivity for determination and the radioactive atom must provide a sufficient number of disintegration per unit of time to provide sufficient sensitivity for accurate determinations. Further, in the case of radioimmunoassay of antigens, the antigenicity must not be deleteriously affected by the conjugation of the radioactive atom to the antigen.

We have discovered, according to this invention, that for the first time the existence of human tumor growth can be determined by assaying a circulating tumor-specific antigen. By means of the present invention, it is possible to detect at least about 1.0 ng. of CEA per ml. of serum. The sensitivity of the assay is limited only by the specific activity of the radioactive atom. This limitation, however, is largely overcome since virtually all of the CEA present in a particular volume of serum can be extracted by our extraction procedures, thus, making it possible to concentrate the specific activity of the radioactive atom. Further, the coprecipitation-inhibition of the tagged CEA can be augmented to increase the sensitivity of the assay.

The CEA can be tagged with radioactive atoms which will react with its chemicallly reactive groups and not substantially diminish its antigenicity. We have found $^{125}I$ to be particularly suitable.

The CEA can be radioiodinated by methods known in the art, with minor modifications to concentration and volumes. The Chloramine T method of Hunter and Greenwood, Biochem. J. 91, 46 (1964) using iodine 125 is particularly useful.

This process results in a radioiodination efficiency of about 20 to 50%. In radioiodinating CEA, a purified CEA is used. The reaction is effected, for example, by using a 200 $\mu$l. reaction mixture containing 100 $\mu$g. of Chloramine T (sodium p-toluenesulfo-chloramine); 0.25–0.4 mg. of purified CEA, and 4 mCi of $^{125}I$ in the form of KI or NaI. The reaction takes place in about 1 minute at room temperature and is stopped by the addition of sodium metabisulfite. The function of the Chloramine T is to oxidize the iodide salt to iodine. The function of the sodium metabisulfite is to reduce unreacted $^{125}I$ back to its salt, other reducing agents can also be used, e.g., potassium metabisulfite. The oxidizing and reducing agents used should not be so strong that they damage the CEA. The product can be separated from residual unreacted $^{125}I$ by chromatography in a cross-linked dextran gel column, e.g., "Sephadex G–100," a gel having an approximate molecular weight exclusion limit of 100,000, a water regain (g. $H_2O$/g. dry gel) of 10.0±1.0, a particle size of 40–120 microns and a bed volume/ml.g. dry gel of 15–20, and removing the tube with the greatest radioactivity in the first peak. The product has the following characteristics:

It is reactive with a specific antibody, has the CEA electrophoresis pattern, has a molecular weight of about 200,000 and has a specific activity of between about 1,000–25,000 dpm./ng., preferably between about 10,000 and 20,000 dpm./ng.., i.e., about 5–10 m$\mu$ Ci/ng. of CEA.

In practicing this invention using radioiodinated CEA, the presence of CEA in human serum is detected using radioimmunoassay procedures based on a modification of the technique of coprecipitation-inhibition described by Farr, J. Infect. Dist. 103,239 (1958).

It is necessary, in order to achieve success in the aforesaid technique, to treat the patient's blood in a manner which will insure that all the CEA, to the exclusion of interfering materials, is in the finally used serum. This can be accomplished by treating blood serum from the patients with a glycoprotein solvent which solubilizes CEA, and clarifying the resulting solution.

The glycoprotein solvent which has been found suitable for this process is perchloric acid. We have found perchloric acid of 0.2 M is preferred since it removes interfering substances. The resulting solution containing dissolved CEA, if any is present, is then clarified. The preferred method is to centrifuge, collect the supernatant and dialyze against water. This usually takes about 24 to 48 hours. The dialysis residue can then be dried by lyophilization. By using this method a purified serum extract containing greater than about 95 percent of the CEA originally present is produced.

It is important to this process that the serum extract is treated as described since the glycoprotein solvent which solubilizes CEA in the initial step dissociates any pre-existing CEA-anti-CEA complexes in the patients serum, enabling the recovery of substantially all the CEA originally present.

Further in order to effectively conduct the radioimmunoassay, a supply of CEA specific antibodies must be assured. This is accomplished by immunizing animals with purified CEA in conventional manner.

An emulsifier, e.g. Freunds adjuvant (complete) is added to CEA in a saline solution. The emulsion can be injected in animals intramuscularly, subcataneously, in the foot pad or any combination of these methods. Animals such as fowl, rabbits, horses, goats, sheep and the like are suitable. The regimen in rabbits, for example, is injections twice a week until five injections are made. After the last injection, blood is collected from the animal. The serum from this blood is unabsorbed anti-CEA antiserum.

In one method, 400 $\mu$g. of CEA in 1 ml. of saline solution (0.9%) is utilized. The injection is made intramuscularly using a volume about four times that injected in the foot pad.

The antibody present in the antiserum, after absorption with normal tissue components, is specific in its activity against CEA to the exclusion of other antigens.

In conducting the radioimmunoassay of CEA, procedures based on the technique of coprecipitation-inhibition are used.

In this process, a titration curve, then a standard inhibition curve are obtained. The standard inhibition curve is used as a control standard, then the radioactive materials are coprecipitated from the solution.

The standard inhibition curve, which is made by the Farr procedure, is a measure of the complex formation with specific antibodies. The curve reflects the amount of CEA present per unit of serum. The measurement is in nanograms per ml., this is plotted against a known percentage of radioactive tagged CEA. The resulting curve is used to plot the amount of CEA in a patient's serum.

A standard inhibition curve is obtained by adding standard CEA to a series of tubes containing powdered perchloric acid extract of normal human serum. A measured amount of anti-CEA-antiserum which had previously been diluted 1:100 with a borate buffer of about pH 8.4, is added to the series of tubes containing a perchloric acid extract of normal blood serum. The buffer used to dilute the normal blood serum can be any buffer, however, a borate buffer with an ionic strength of 0.1, and a pH 8.4 is preferred.

The resulting solutions are incubated at low temperatures, e.g., about 4° C. for a sufficient time to complete the reaction, usually about 18 hours is sufficient. Following the incubation, a measured amount of $^{125}I$ is added to each of the tubes. The incubation is then continued for an additional 2 hours at about 37° C. When the incubation is completed, a precipitant which precipitates the antibody and antigen-antibody complex but not the antigen, is added to the solution to coprecipitate the antibody bound CEA. Preferably, a saturated ammonium sulfate solution is used.

Under the conditions described above, free CEA remains in solution. The $^{125}I$ content of the precipitate or supernatant is then determined from a reading on a suitable instrument and the amount of CEA in the serum is then determined by reference to a standard.

The assay performed on the powdered perchloric acid extracts of serum, processed in the same manner as the standard CEA, results in a determination of the amount of CEA in the patient's blood. This in turn indicates the presence or absence of digestive system cancer in the patient.

The following examples illustrate the invention.

EXAMPLE 1

Isolation of carcinoembryonic antigen fraction

Tumor tissue from adenocarcinoma of the colon is dissected and as much normal tissue as possible is discarded. The remaining tumor tissue is passed through a meat grinder and stored in 1000 gram lots, at −20° C. 1000 grams of the minced tissue is suspended in distilled water to total volume of 4000 ml., and homogenized at 15,000 r.p.m. in a water cooled homogenizer for 1 hour.

An equal volume of 2 N perchloric acid at 4° C. is added slowly, with constant stirring. This suspension is stirred for 30 minutes at room temperature, and then centrifuged at 6000 r.p.m. at 4° C. for 30 minutes in a refrigerated centrifuge (6 x 250 ml. fixed angle rotor). The supernatant is removed and placed in flat 3″ wide dialyzer tubing, previously soaked for 1 hour in distilled water to render it more pliable. Dialysis is carried out against cold running tap water for 48 hours, and then against continuous changes of large volumes of distilled water at 4° C. for an additional 48 hours. The dialyzed residue is placed in 5000 ml. round-bottom flasks, 1500 ml. per flask, shell-frozen in a methanol-Dry Ice bath, and lyophylized on an 8 liter capacity lyophylizer. Just prior to complete lyophylization (24–30 hours) the flasks are removed, the partially dried crude extract is thawed out and the resulting solution spun at 14,000 r.p.m. at 4° for 30 minutes in a refrigerated centrifuge (8 x 30 ml. fixed angle rotor). The supernatant is removed and then passed sequentially through $1.2\mu$, $0.45\mu$ and $0.22\mu$ millipore membrane filters. The clarified solution is shell-frozen and lyophylized to dryness.

1.5 gms. of dried crude extract are dissolved in 50 ml. of 0.05 M $NaH_2PO_4$ buffer (pH 4.5) in normal saline. The phosphate saline buffer, pH 4.5, serves as the eluting solution in all subsequent column chromatography. The sample is then put through a Sepharose 4-B column. The column used is a Pharmacia K 100/100 (100 cm.×10 cm.) with a bed length of 89 cm. The temperature is maintained at 4°–5° by a recirculating cooler. The solution is pumped at an upward flow rate of 150 ml./hr. by a constant flow pump (LKB "Varioperpex 1200" Peristaltic Pump). 25 ml. fractions are collected in a fraction collector (LKB "Ultrorac 7000"). The fractions are constantly monitored at 280 m$\mu$. on UV absorptionmeter. The active fraction is collected after 4750 ml. are eluted. The run takes approximately 47 hours.

The total volume of the active fraction is 750 ml. The active fractions are pooled, dialyzed for 48 hours at 4° against several changes of large volumes of distilled water shell-frozen and lyophylized.

200 mg. of dried material from the Sepharose 4-B column is then dissolved in 10 ml. of standard buffer and put through a Sephadex G–200 column. The column used is a Pharmacia K 50/100 (100 cm. x 10 cm.) with a bed length of 90 cm. The temperature is maintained at 4° with a recirculating cooler. The solution is pumped at an upward flow rate of 40 ml./hr. on a constant flow pump (LKB "Perpex 10200" Peristaltic Pump). 10 ml. fractions are constantly monitored at 280 m$\mu$ on a UV absorptionmeter. The active fraction is collected after 820 ml. of eluate have passed.

The duration of the run is 30 hours and the total volume of active fraction is 190 ml. The active fractions are pooled, dialyzed for 48 hours at 4° against several changes of large volumes of distilled water, shell-frozen and lyophylized.

EXAMPLE 2

Purification of isolated CEA containing fraction by block electrophoresis

The block electrophoresis medium, Sephadex G–25 Fine, is swollen with water for 2 hours at 80° and washed by decantation with borate of pH 8.6 and ionic strength 0.05 and then suction filtered through a sintered glass disk.

A thick slurry of the gel is poured onto a Lucite block support of 61 cm. x 7.5 cm. x 1 cm. in dimensions and allowed to distribute itself evenly along the plate to a depth of 1 cm. The surface is then blotted with cotton gauze sponges until firm but not completely dry.

The block is then fitted with 3 mm. chromatography paper contacts (Whatman) all aligned in the same direction of flow of the paper. The block is then placed in the electrophoresis apparatus and allowed to equilibrate for 1 hour under the operating conditions of 400 volts, with a constant current of approximately 20 ma. at 4°. A 1 cm. strip is then removed from the center of the block and mixed well with 60 mg. of dried CEA from Example 1 which was previously dissolved in a minimal amount of 0.05 M borate, approximately 0.5 ml. The resulting slurry is then poured back in the central strip. One to two drops of ferritin (6× recrystallized) at a concentration of 100 mg./ml. is then spotted at the cathodal extremity of the block. 24 hours after the start of the run, the ferritin marker moves 18 cm. anodally. At that time the block is removed from the electrophoresis apparatus and 2 centimeter strips between the zone of application and the anodal extremity are eluted with 2M NaCl passed through $0.20\mu$ disposable grid membrane. (Nalgene.) The activity is localized 10–14 cm. anodal to the application zone with weaker activity being found 8–10 cm. anodal to the application zone.

Each active strip is eluted and dialyzed in pre-soaked 1³⁄₁₆″ dialyzer tubing against numerous changes of large volumes of distilled water at 4° for 48 hours. The dialyzate is shell-frozen and lyophylized to dryness. The dried, purified CEA is stored under vacuum over calcium chloride at 4°. The product has the following identifying characteristics:

It forms a single line precipitate with unabsorbed antiserum in gel diffusion tests, is soluble in perchloric acid, it migrates anodally 10–14 cm. in block electrophoresis at the same time a ferritin marker migrates 18 cm. anodally when a borate buffer of pH 8.6 and ionic strength of 0.5 and 400 volts and 20 ma. are the conditions of the block electrophoresis. Further, the product has a molecular weight of 200,000 and a spectrophotometer absorption peak wave length of 280 m$\mu$.

EXAMPLE 3

Preparation of anti-CEA antiserum

Twelve adult, male, New Zealand white rabbits weighing 2.0 kg. were divided into 3 groups of 4 each. The different groups were immunized with the following materials: normal colon tissue extract, tumor tissue extract from the same individual from whom the normal tissue extract was obtained, pooled human plasma. The tumor tissue extract was from specimens of tumors diagnosed and confirmed to be adenocarcinoma of the colon. The normal tissue extracts and tumor tissue extracts were formed in accordance with the procedure described in Example 1. The pooled human plasma was obtained from 30 normal donors representing all major blood groups.

The injections which were given twice weekly for 4 weeks contained 3 mg. of protein in 0.6 ml. of tissue extract or plasma emulsified in an equal volume of Freund's adjuvant (complete). Injections of 0.1 to 0.2 ml. were given into a foot-pad and the remainder intramuscularly into the flank. Twelve days following the last injections, the animals were bled from their marginal ear veins and the sera obtained from each group was pooled separately for testing.

The sera from each group was absorbed with normal tissue and the resulting precipitate separated. The supernatants were then subjected to the Ouchterlony technique of double diffusion in agar gel. This was performed in one percent agar-in-saline with merthiolate added as a preservative to a final concentration of 1/10,000. The patterns were cut in the gel plates so that the central and peripheral wells were spaced 1.0 cm. apart. Each well was filled with 0.15 ml. of test material. The antigen concentration used was 10 mg. protein per ml. Initial incubation of the plates was carried out in a moist environment at 37° for 24 hours to encourage diffusion of material from the wells. Patterns were allowed to develop in the same humid atmosphere at 25° for seven days. The patterns from the serum of the animals which were immunized with tumor tissue extract were a single line, indicating the serum contained antibodies specific for the tumor. No patterns developed from the sera of animals immunized with normal tissue or normal human plasma.

EXAMPLE 4

Radioiodination of CEA

A 500 µl. reaction mixture is formed containing 100 µg. of Chloramine T, 250 µg. of CEA from Example 2 and 4 mCi of $^{125}I$ in the form of KI. The reaction is allowed to proceed for 1 minute at room temperature and is then stopped by the addition of 240 µg. of sodium metabisulfite. The resulting product $^{125}I$–CEA is separated from residual unreacted $^{125}I$ by chromatography on a Sephadex G–100 column. The product has a specific activity of about 5 mµ Ci/µg.

EXAMPLE 5

Preparation of blood samples for radioimmunoassay 5 ml. of 2.0 M perchloric acid is added to each of 5 ml. of serum obtained from blood samples from 200 human subjects and stirred at room temperature for 20 minutes. The resulting precipitate is removed by centrifugation in a fixed-angle rotor at 9000 gravity for 10 minutes at 4° C. The resulting sediment is discarded and the supernatant dialyzed against cold, running tap water for 24 hours, and then against repeated changes of distilled water at 4° C. for an additional 24 hours. The dialyzed residue is then lyophylized to a dry powder.

EXAMPLE 6

Radioimmunoassay of CEA

During this procedure, normal human serum is diluted 1:100 with borate buffer (ionic strength 0.1, pH 8.4) and these preparations employed as diluents for the anti-CEA antiserum prepared from goats in accordance with the procedure of Example 3 and the $^{125}I$–CEA prepared according to the procedure of Example 4.

(a) Preparation of standard inhibition curve.—5 ml. of standard CEA are added to a series of tubes, each of which contains the powdered extract of 5 ml. of normal human serum prepared according ot the procedure of Example 5. A 500 µl. of diluted anti-CEA antiserum is then added to each tube. The resulting solutions are then incubated at 4° for 18 hours following which 500 µl. of $^{125}I$–CEA is added to each tube. The incubation is then continued for an additional 2 hours at 37°. Then 0.1 ml. of cold (4°) saturated aqueous ammonium sulfate is added to each tube. In the resulting 50 percent-saturated solutions of ammonium sulfate, the antibody-bound CEA undergoes coprecipitation, while the free CEA remains in solution. After a wash in 3.0 ml. of 50 percent saturated aqueous ammonium sulfate, at 4°, the $^{125}I$–CEA content of the precipitate is determined in a NuclearChicago Duel Channel Automated Scintillation Gamma-Ray analyzer. The resulting standard inhibition curve is as follows:

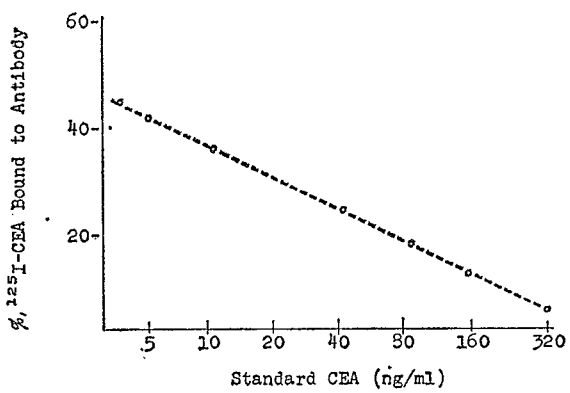

(b) Radioimmunoassay of serum.—The powdered extracts of serum obtained from each of the 200 human subjects are processed in an identical fashion with the exception that no standard CEA is added to any of the specimens.

The results of the radioimmunoassay show that CEA could not be detected in any serum obtained from normal subjects, pregnant women, patients with cancerous diseases of non-digestive system organs, patients with non-malignant diseases of the digestive organs and patients with non-enteric, non-neoplastic conditions.

In 36 patients with adenocarcinoma of either the colon or rectum, studied at a time when tumor tissue was known to be present within the body, all but one serum was found to have detectable levels of circulating CEA. The only known false negative result recorded to date was in a patient with a localized, invasive polypoid adenocarcinoma of the transverse colon which prevented the CEA from entering the circulatory system. At operations, this patient was found to have a volvulus of the large bowel with circulatory impairment.

The lowest positive value was recorded in the serum of a patient with a malignant large bowel tumor, with 3 ng./ml. No false positive results were obtained. Patients who had undergone surgery for colonic or rectal cancer and who showed no evidence of residual or recurrent tumor growth did not have detectable circulating CEA. In seven cases where both pre-operative and post-operative blood samples were obtained, the post-operative values of serum CEA remained elevated only in the one patient with evidence of tumor dissemination in operation.

What is claimed is:

1. A process for producing human carcinoembryonic antigen which comprises
   (a) homogenizing adenocarcinoma tissue of tumors originating in the digestive system epithelium derived from embryonic entodermal tissue;
   (b) treating the homogenate with a glycoprotein solvent;
   (c) separating the precipitate and clarifying the resulting solution;
   (d) dialyzing the clarified solution;
   (e) concentrating the dialyzate;
   (f) clarifying the resulting solution;
   (g) drying the clarified solution;
   (h) subjecting the resulting material to sequential chromatography on two different gel columns, the first of which is an agarose gel having about 4% by weight agarose and a particle size of from 40 to 190 microns and the second of which is a hydrophilic water-insoluble cross-linked dextran polymer gel;

(i) collecting and concentrating the eluates which have a spectrophotometric absorption peak wave length of 280 mµ and a molecular weight of 200,000;

(j) subjecting the collected eluates to electrophoresis;

(k) collecting the fractions which migrate anodally about 10–14 cm. to the application zone at the same time ferritin migrates 18 cm. anodally from the cathodal extremity.

2. The process of claim 1 wherein in step (b) the glycoprotein solvent is perchloric acid having a concentration of from 0.5 N to about 2 N.

3. The process of claim 1 wherein in step (c) the precipitate is separated and the resulting solution is clarified by centrifugation.

4. The process of claim 1 wherein in step (d) the solution is dialyzed against water.

5. The process of claim 1 wherein in step (e) the dialyzate is concentrated by partial lyophylization for about 24 to 30 hours.

6. The process of claim 1 wherein in step (f) the solution is clarified by high speed centrifugation at from about 12,000 to 16,000 r.p.m. and sequential filtration on filters having diminishing pore sizes of from about 1.2µ to about 0.20µ.

7. The process of claim 1 wherein in step (g) the clarified solution is shell-frozen prior to drying by lyophilization.

8. The process of claim 1 wherein in step (h) the material is first dissolved in an aqueous buffer of about pH 4.5, then run through the agarose gel column which separates the CEA containing fraction from higher and lower molecular weight material and colloidal particles, the eluates have a spectrophotometer absorption peak wavelength of 280 mµ and a molecular weight of 200,000 are collected, dialyzed and lyophilized, the lyophylizate dissolved in an aqueous buffer of pH about 4.5 and run through the second cross-linked dextran gel column which has a higher resolving power than the first column and separates CEA from higher and lower molecular weight material.

9. The process of claim 1 wherein the step (j) the electrophoresis is block electrophoresis, the active fraction is dissolved in a borate buffer of pH about 8.2 to 9.2 with an ionic strength of about 0.0125 to 0.10, the voltage applied is about 300 to 500 volts, the current is about 20 ma. and the marker is ferritin.

10. Carcinoembryonic antigen characterized by forming a single line precipitate with its specific antibody in unabsorbed antiserum in gel diffusion tests, being soluble in perchloric acid, migrating anodally 10–14 cm. in block electrophoresis, at the same time a ferritin marker migrates 18 cm. anodally, using 400 volts and about 20 ma. with a borate buffer of pH 8.6 and ionic strength 0.05, having a molecular weight of about 200,000 and having a spectrophotometer absorption peak wavelength of 280 mµ.

11. The method of radioiodinating carcinoembryonic antigen which comprises reacting iodine 125 with the substance of claim 10.

12. Radioiodinated carcinoembryonic antigen having the same characteristics as CEA and having a specific activity of about 5–10 mµ Ci/ng. of CEA.

13. A method for detecting the presence of carcinoembryonic antigen in blood which comprises (a) adding a measured amount of anti-CEA antiserum to a sample of perchloric acid extracted blood serum;

(b) incubating the mixture;

(c) adding a measured amount of radioactive tagged carcinoembryonic antigen to the incubated mixture;

(d) incubating the mixture;

(e) adding a protein precipitant to the incubated mixture thereby coprecipitating all the CEA-anti-CEA complexes; and (f) measuring the radioactive content of the supernatant or precipitate.

14. The method of claim 13 wherein in step (a) the anti-CEA antiserum is diluted with normal blood serum to a dilution of 1:100 in a buffer of about pH 8.4.

15. The method of claim 13 wherein in step (c) the CEA is tagged with $^{125}$I.

16. The method of claim 13 wherein in step (e) the unreacted CEA remains in solution and the protein precipitant is saturated aqueous ammonium sulfate.

17. The method of claim 13 wherein in step (f) the radioactive content of the CEA in the blood is determined by comparing to a standard curve.

18. In a process of producing human carcinoembryonic antigen, the step which comprises collecting by sequential chromatography on first and second gel column, fractions of adenocarcinoma tissue of tumors originating in the digestive system epithelium derived from embryonic entodermal tissue, said fractions being those which have a spectrophotometric absorption peak wave length of 280 mµ and a molecular weight of 200,000, the first gel column being an agarose gel containing about 4% by weight of agarose and having a particle size of 40 to 190 microns and a fractionation range of $3 \times 10^5$ to $3 \times 10^6$ and the second gel column being a hydrophilic, water insoluble cross-linked dextran gel with a molecular weight exclusion limit of about 200,000.

19. The process of claim 18 wherein the first gel column separates the CEA containing fraction from lower and higher molecular weight material and colloidal particles and the second gel column separates the CEA containing fraction from higher and lower molecular weight material which was not resolved by the first column.

20. In a process of producing human carcinoembryonic antigen, the step which comprises collecting by electrophoresis the fractions of adenocarcinoma tissue of tumors originating in the digestive system epithelium derived from embryonic enterdermal tissue, said fractions being those which migrate anodally about 10–14 cm. to the application zone at the same time ferritin migrates 18 cm. anodally from the cathodal extremity when a borate buffer of pH 8.6 and ionic strength of 0.05, a voltage of 400 and about 20 ma. are utilized.

21. The process of claim 20 wherein the electrophoresis medium utilized is a water-insoluble hydrophilic, cross-linked dextran polymer gel having a molecular weight exclusion limit of about 5,000, a water regain of 2.5±0.2 g. H₂O/g. dry gel and a particle size of 20–80 microns.

22. In a process for making anti-CEA-antiserum specific to human carcinoembryonic antigens, the step which comprises treating with normal colon tissue extract, serum from animals immunized with processed adenocarcinoma tissue originating in the digestive system epithelium derived from embryonic entodermal tissue.

References Cited

UNITED STATES PATENTS

| | | | |
|---|---|---|---|
| 2,165,370 | 7/1939 | Gruskin | 424—9 |
| 2,165,371 | 7/1939 | Gruskin | 424—9 |
| 3,284,434 | 11/1966 | Sutherland | 424—9 |

BENJAMIN R. PADGETT, Primary Examiner

U.S. Cl. X.R.

23—230 B; 195—103.5 R; 250—106 T; 252—408; 424—8, 9, 12, 88